(12) United States Patent
Honekamp

(10) Patent No.: US 9,920,744 B2
(45) Date of Patent: Mar. 20, 2018

(54) SYSTEM AND METHOD FOR DETECTING ROTOR ASYMMETRY

(71) Applicant: General Electric Company, Schenectady, NY (US)

(72) Inventor: Thorsten Honekamp, Emlichheim (DE)

(73) Assignee: General Electric Company, Schenectady, NY (US)

( * ) Notice: Subject to any disclaimer, the term of this patent is extended or adjusted under 35 U.S.C. 154(b) by 367 days.

(21) Appl. No.: 14/702,980

(22) Filed: May 4, 2015

(65) Prior Publication Data
US 2016/0327024 A1 Nov. 10, 2016

(51) Int. Cl.
| | | |
|---|---|---|
| F03D 7/04 | (2006.01) | |
| F03D 7/02 | (2006.01) | |
| F03D 1/06 | (2006.01) | |
| G01P 5/06 | (2006.01) | |
| F03D 17/00 | (2016.01) | |

(52) U.S. Cl.
CPC ........... *F03D 7/042* (2013.01); *F03D 1/0666* (2013.01); *F03D 7/024* (2013.01); *F03D 7/0224* (2013.01); *F03D 17/00* (2016.05); *G01P 5/06* (2013.01); *F05B 2260/966* (2013.01); *Y02E 10/721* (2013.01); *Y02E 10/723* (2013.01)

(58) Field of Classification Search
None
See application file for complete search history.

(56) References Cited

U.S. PATENT DOCUMENTS

| | | | |
|---|---|---|---|
| 7,861,583 B2 | 1/2011 | Honhoff et al. | |
| 8,210,811 B2 * | 7/2012 | Loh | F03D 7/0224 416/1 |
| 2008/0307853 A1 * | 12/2008 | Siebers | G01P 21/025 73/1.29 |
| 2015/0086362 A1 | 3/2015 | Fu et al. | |

FOREIGN PATENT DOCUMENTS

| | | |
|---|---|---|
| EP | 1793123 A2 | 6/2007 |
| EP | 1811172 A1 | 7/2007 |
| EP | 2500562 A2 | 9/2012 |

OTHER PUBLICATIONS

European Search Report and Written Opinion issued in connection with corresponding EP Application No. 16167747.1 dated Sep. 30, 2018.

* cited by examiner

*Primary Examiner* — Dwayne J White
*Assistant Examiner* — Juan G Flores
(74) *Attorney, Agent, or Firm* — Dority & Manning, P.A.

(57) ABSTRACT

The present subject matter is directed to systems and methods for detecting rotor asymmetry of a wind turbine. The method includes measuring wind condition at a location downwind of the rotor for a plurality of rotor positions. Another step includes storing the measured wind condition(s) in predetermined wind bins. The method also includes analyzing the stored wind conditions for each of the predetermined wind bins. If a particular wind bin reaches a certain threshold of captured data points, then the method includes determining a variance between each of the stored wind conditions for the predetermined wind bins that have reached the threshold, wherein a variance between any one of the measured wind conditions greater than a predetermined amount is indicative of rotor asymmetry.

18 Claims, 8 Drawing Sheets

SYSTEM AND METHOD FOR DETECTING ROTOR ASYMMETRY

FIELD OF THE INVENTION

The present subject matter relates generally to wind turbines and, more particularly, to systems and methods for detecting rotor asymmetry in wind turbines based on one or more anemometers measurements.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. More specifically, each rotor blade is typically secured at its root end and spans radially outboard to a free tip end. The leading edge of the rotor blade connects the forward-most points of the blade that first contact the air. The trailing edge of the blade is where airflow that has been separated by the leading edge rejoins after passing over the suction and pressure surfaces of the blade. The generator then converts the mechanical energy to electrical energy that may be deployed to a utility grid.

In order to prevent damage to the blades, wind turbines often include a controller to manage wind turbine operation, such as start-up/shut-down, power output, power curve measurement, nacelle yaw, and blade pitch, in response to wind speed and/or other controller inputs. Inputs to the controller typically include various wind characteristics such as wind speed and direction taken from an anemometer with a vane. The anemometer measurements that are made using these instruments are subject to a variety of effects that cause inaccuracies, including the turbulent effect of the rotating blades into and out of the fluid flow path of the anemometer on the nacelle. Consequently, an additional meteorological, or "met" mast is sometimes arranged a suitable distance upwind of the wind turbine for taking "freestream" wind speed and direction measurements which approximate the actual wind speed and direction that would have been measured at the turbine location had the turbine not been present.

The relationship between the measured wind speed on the turbine nacelle and the actual freestream wind speed is sometimes referred to as the "nacelle-to-freestream transfer function," or simply the "transfer function." It is well known in the art that the transfer function between the measured wind speed on the nacelle and the freestream wind speed depends on multiple variables, including but not limited to, the mounting location of the anemometer, blade design, and/or the pitch angle of each of the rotor blades. Further, U.S. Pat. No. 7,861,583 entitled "Wind Turbine Anemometry Compensation" filed on Jan. 17, 2008, which is incorporated herein by reference in its entirety, discloses a system for estimating a freestream wind characteristic for a wind turbine having a rotor.

In addition, the rotor blades of the wind turbine are desirably installed at a certain pitch angle referenced from a "zero" location. If the zero reference location is inaccurate, however, the pitch angle of each of the rotor blades may be offset causing a rotor imbalance or asymmetry during operation of the wind turbine. Further, even if the rotor blades are installed at the proper pitch angle, the angle of one or more of the blades may become offset during normal operation, e.g. due to various wind conditions. Rotor asymmetry can cause undesirable wear and tear and/or loading on the wind turbine as well as inefficient operation.

As such, it is desirable to detect rotor asymmetry such that the imbalance can be corrected and resulting loads of the wind turbine and/or power loss can be reduced. Conventional methods for detecting rotor asymmetry include personnel climbing uptower to install one or more reference spots or locations on the nacelle. A ground camera then takes pictures of the spot locations to evaluate the position of each of the rotor blades. Based on the locations, the pitch angles may be adjusted by the wind turbine controller. Such methods, however, can be time consuming, expensive, and even dangerous.

Thus, an improved system and method for detecting rotor asymmetry is desired in the art. Accordingly, the present disclosure is directed to a system and method for detecting rotor asymmetry based on one or more anemometer measurements.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for detecting rotor asymmetry of a wind turbine. The method includes measuring, via a sensor (e.g. an anemometer), at least one wind condition at a location downwind of the rotor for a plurality of rotor positions. Another step includes storing the measured wind speed quantities in predetermined wind bins (e.g. one sample per second). The method also includes analyzing the stored quantities for each of the predetermined wind bins, for example, by averaging the data in each bin. If a particular bin reaches a certain threshold of captured data points, then the controller is configured to determine a variance between each of the measured wind speed quantities for that bin. Thus, a variance between any one of the measured wind speeds greater than a predetermined amount is indicative of rotor asymmetry.

In one embodiment, the method also includes storing the rotor positions for each of the measured wind conditions in predetermined position bins, and plotting the stored wind conditions for the predetermined wind bins that reach the threshold against the stored rotor positions. In another embodiment, the predetermined amount includes the remaining measured wind speeds plus or minus from about 3%. In alternative embodiments, the predetermined amount may include the remaining measured wind speeds plus or minus from less than about 3% or greater than about 3%.

In a further embodiment, the method may also include providing predetermined pitch angle settings for each of the rotor blades of the wind turbine at installation of the wind turbine. Thus, the method may also include determining a difference between the predetermined pitch angle settings of each of the rotor blades at installation and current pitch angle settings.

In certain embodiments, the rotor positions are defined by the rotor blades rotating through a twelve o'clock position. As such, the wind speed is measured each time one of the blades passes through the twelve o'clock position. Further, in particular embodiments, the twelve o'clock position corresponds to or intersects with a wind stream of the sensor.

In yet another embodiment, a variance of any one of the measured wind speeds from the remaining measured wind speeds greater than the predetermined amount is indicative of a varying pitch angle for a corresponding rotor blade when compared to the remaining rotor blades. Thus, in certain embodiments, a varying pitch angle can be representative of rotor asymmetry.

In another aspect, the present disclosure is directed to a system for detecting rotor asymmetry of a wind turbine. The system includes one or more sensors mounted at a location downwind of a rotor of the wind turbine and a controller communicatively coupled with the one or more sensors. Further, the sensors are configured to measure at least one wind condition for a plurality of rotor positions. The controller is configured to perform one or more operations, including but not limited to storing the wind conditions in predetermined wind bins, analyzing the stored wind conditions for each of the predetermined wind bins, and determining a variance between each of the stored wind conditions for predetermined wind bins that reach a certain threshold of stored wind conditions, wherein a variance between any one of the measured wind conditions greater than a predetermined amount is indicative of rotor asymmetry.

In yet another aspect, the present disclosure is directed to a method for operating a wind turbine. The method includes measuring, via a sensor, at least one wind condition at a location downwind of the rotor for a plurality of rotor positions. Another step includes storing the wind conditions in predetermined wind bins. The method also includes determining if one or more of the predetermined wind bins reach a certain threshold of stored wind conditions. Still another step includes comparing the measured wind conditions for each of the rotor positions for the predetermined wind bins that reach the threshold with a predetermined range, wherein a measured wind condition outside of the predetermined range is indicative of rotor asymmetry. Thus, the method also includes implementing a corrective action when at least one of the measured wind conditions is outside of the predetermined range.

In certain embodiments, for example, the corrective action may include at least one of or a combination of the following: altering a pitch angle of a rotor blade, modifying a generator torque, modifying a generator speed, modifying a power output, yawing a nacelle of the wind turbine, braking one or more wind turbine components, activating an airflow modifying element on a rotor blade, sending an alarm, or similar.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
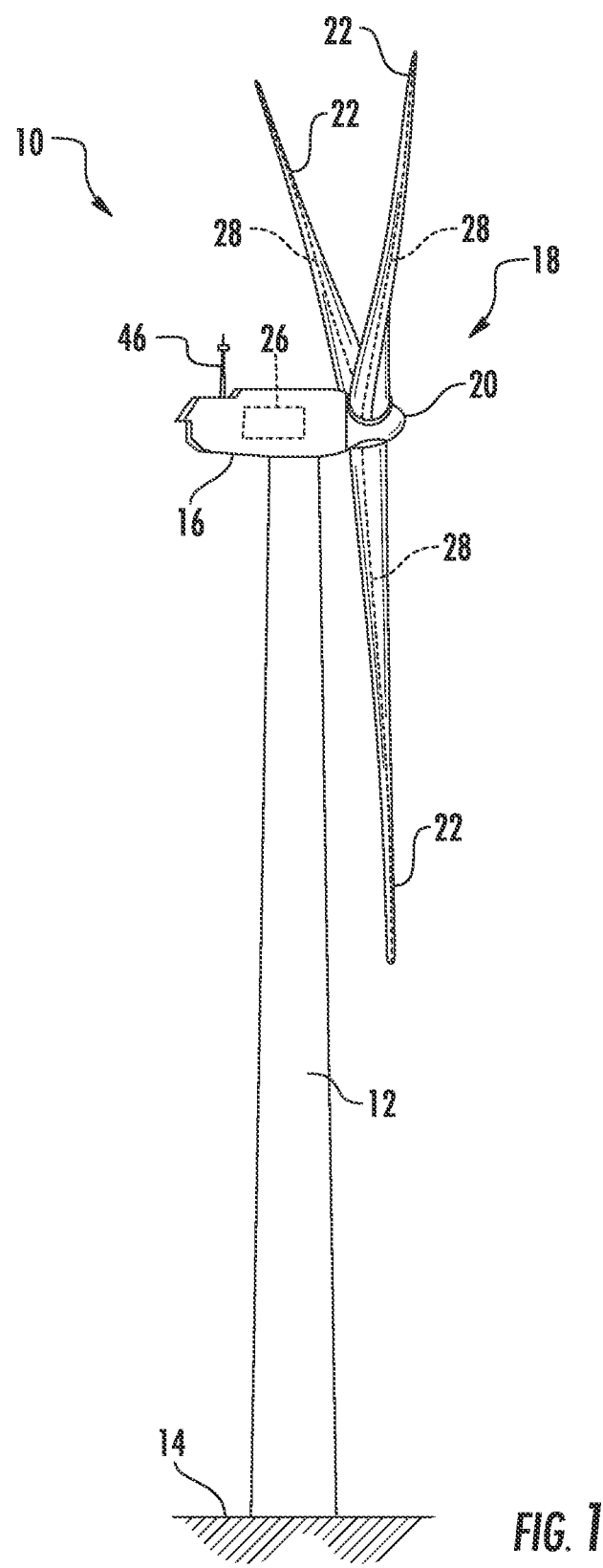
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to systems and methods for detecting rotor asymmetry of a wind turbine. More specifically, in certain embodiments, an anemometer located downwind of the rotor measures a wind condition, e.g. wind speed, for a plurality of rotor positions, e.g. as each of the rotor blades passes through the wind stream of the sensor. The measured quantities are then stored, for example, in a wind turbine controller in predetermined wind bins (e.g. one sample per second). The controller can then analyze the data, for example, by averaging the data over a certain time period. If a particular bin has a certain amount of captured data points, then the controller is configured to determine a variance between each of the measured wind conditions at each of the rotor positions. For example, in one embodiment, the controller may be configured to start the analysis when a certain amount of data points have been captured for a certain bin, e.g. one hour. If a variance between any one of the measured wind conditions is greater than a predetermined amount, then the pitch angle of that rotor blade is likely offset as compared to the remaining rotor blades, which is indicative of rotor asymmetry.

In addition, in the data analysis, the high sampled wind speed data from one wind speed bin can be binned over multiple rotor positions. For example, the corresponding rotor positions for each of the measured wind conditions may also be stored in predetermined position bins. Thus, the controller may be configured to plot the stored wind conditions for the predetermined wind bins that reach the threshold against the stored rotor positions. Accordingly, the controller is configured to compare the wind speed average of each of the wind bins over all rotor position bin averages to determine rotor asymmetry.

The present disclosure provides many advantages not present in the prior art. For example, by detecting rotor asymmetry, the imbalance can be corrected and the wind turbine controller can use the information to detect possible mass imbalances so as to reduce undesirable loads. Further, large power losses from multiple wind turbines in a wind farm having rotor asymmetry can be avoided as well.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced. The wind turbine 10 may also include a turbine control system including a turbine controller 26 within the nacelle 16 or somewhere else associated with the wind turbine 10 as will be discussed in more detail below in regards to FIG. 2.

Figure 2:
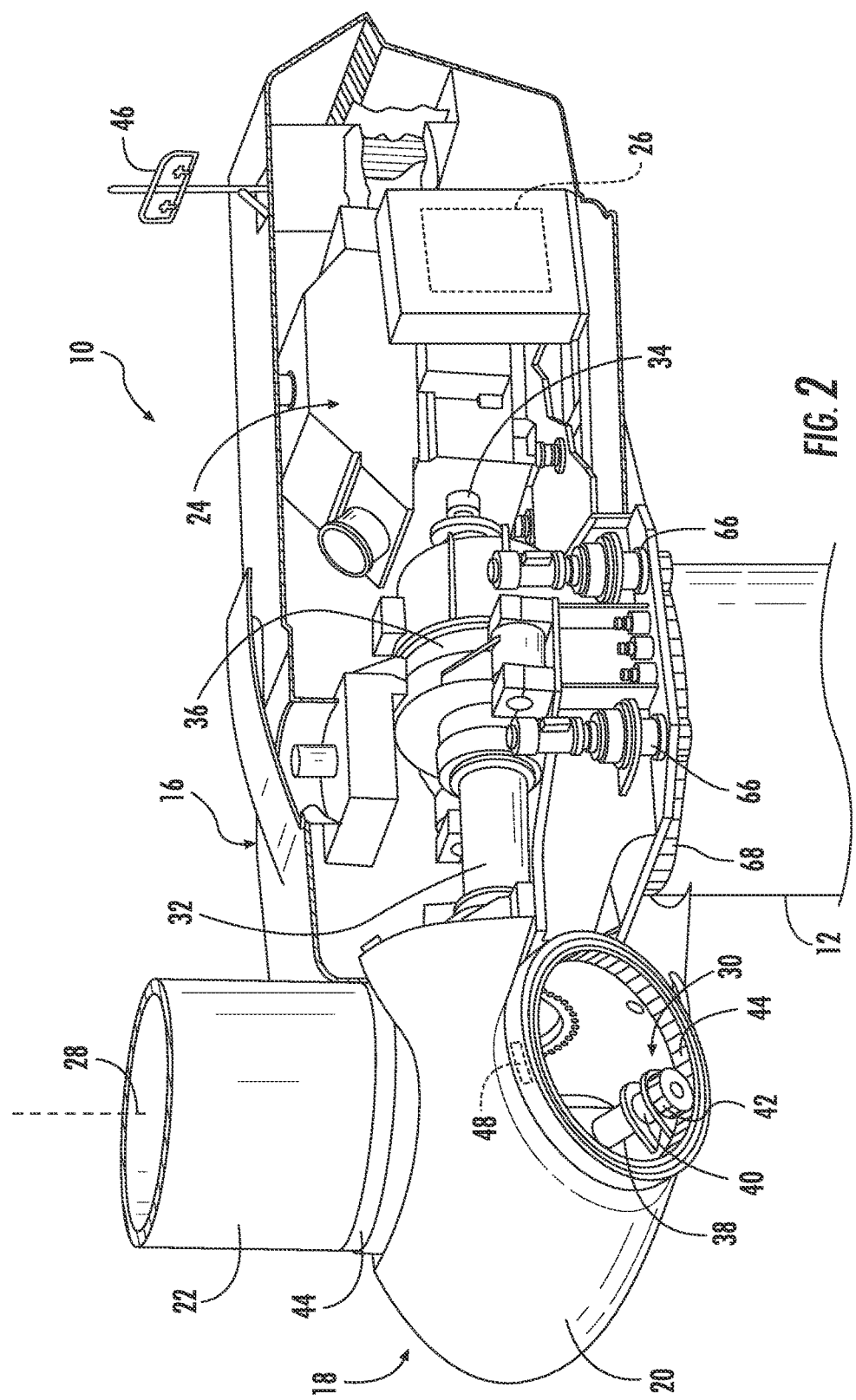
FIG. 2 illustrates a simplified, internal view of one embodiment of a nacelle of the wind turbine according to the present disclosure.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 32 coupled to the hub 20 for rotation therewith. The rotor shaft 32 may, in turn, be rotatably coupled to a generator shaft 34 of the generator 24 through a gearbox 36. As is generally understood, the rotor shaft 32 may provide a low speed, high torque input to the gearbox 36 in response to rotation of the rotor blades 22 and the hub 20. The gearbox 36 may then be configured to convert the low speed, high torque input to a high speed, low torque output to drive the generator shaft 34 and, thus, the generator 24.

As is generally understood, the turbine controller 26 may be communicatively coupled to any number of the components of the wind turbine 10 in order to control the operation of such components. For example, the controller 26 may be configured to adjust the blade pitch or pitch angle of each rotor blade 22 (i.e., an angle that determines a perspective of the blade 22 with respect to the direction of the wind) about a pitch axis 28 in order to control the rotational speed of the rotor blade 22 and/or the power output generated by the wind turbine 10. More specifically, the turbine controller 26 may be communicatively coupled to a pitch adjustment mechanism 30 of the wind turbine 10 (one of which is shown) to facilitate rotation of each rotor blade 22 about its pitch axis 28. For instance, the turbine controller 26 may determine pitch angle setpoints of the rotor blades 22, either individually or simultaneously. The controller 26 can then provide control signals indicative of the pitch angle setpoints to the pitch adjustment mechanism 30. During operation of the wind turbine 10, the controller 26 may generally provide pitch angle setpoints in order to alter the pitch angle of each rotor blade 22 between −5 degrees (i.e., a power position of the rotor blade 22) and 90 degrees (i.e., a feathered position of the rotor blade 22).

In general, each pitch adjustment mechanism 30 may include a pitch controller and/or any suitable components and may have any suitable configuration that allows the pitch adjustment mechanism 30 to function as described herein. For example, in several embodiments, each pitch adjustment mechanism 30 may include a pitch drive motor 38 (e.g., any suitable electric motor), a pitch drive gearbox 40, and a pitch drive pinion 42. In such embodiments, the pitch drive motor 38 may be coupled to the pitch drive gearbox 40 so that the pitch drive motor 38 imparts mechanical force to the pitch drive gearbox 40. Similarly, the pitch drive gearbox 40 may be coupled to the pitch drive pinion 42 for rotation therewith. The pitch drive pinion 42 may, in turn, be in rotational engagement with a pitch bearing 44 coupled between the hub 20 and a corresponding rotor blade 22 such that rotation of the pitch drive pinion 42 causes rotation of the pitch bearing 44. Thus, in such embodiments, rotation of the pitch drive motor 38 drives the pitch drive gearbox 40 and the pitch drive pinion 42, thereby rotating the pitch bearing 44 and the rotor blade 22 about the pitch axis 28.

In alternative embodiments, it should be appreciated that each pitch adjustment mechanism 30 may have any other suitable configuration that facilitates rotation of a rotor blade 22 about its pitch axis 28. For instance, the pitch adjustment mechanisms 30 are known that include a hydraulic or pneumatic driven device (e.g., a hydraulic or pneumatic cylinder) configured to transmit rotational energy to the pitch bearing 44, thereby causing the rotor blade 22 to rotate about its pitch axis 28. Thus, in several embodiments, instead of the electric pitch drive motor 38 described above, each pitch adjustment mechanism 30 may include a hydraulic or pneumatic driven device that utilizes fluid pressure to apply torque to the pitch bearing 44. Similarly, the wind turbine 10 may include one or more yaw drive mechanisms 66 communicatively coupled to the controller 26, with each yaw drive mechanism(s) 66 being configured to change the angle of the nacelle 16 relative to the wind (e.g., by engaging a yaw bearing 68 of the wind turbine 10).

Referring still to FIG. 2, the wind turbine 10 may also include one or more sensors 46, 48 for monitoring one or more parameters or conditions of the wind turbine 10 and/or related wind conditions. For example, as shown, the wind turbine 10 includes a sensor 48 configured for monitoring the pitch drive mechanism 30 and a wind sensor 46 configured to measure one or more wind conditions near the wind turbine 10. More specifically, in the illustrated embodiment, the wind sensor 46 is an anemometer mounted on the nacelle 16 of the wind turbine 10 that measures at least one wind condition at a location downwind of the rotor 18. A wind condition as described herein may be reflective of wind speed, wind direction, wind turbulence, wake, or any other suitable wind or weather condition and may also include multiple wind vectors. In certain embodiments, the anemometer 46 may include a cup-type configuration having cups at the ends of arms, which rotate when the wind blows. However, other types of anemometers may also be used, including vane-type anemometers, pressure-tube anemometers, hot-wire anemometers, and sonic anemometers.

As used herein, a condition of the wind turbine 10 is "monitored" when a sensor is used to determine its present value. Thus, the term "monitor" and variations thereof are used to indicate that the sensors 46, 48 need not provide a direct measurement of the parameter and/or condition being monitored. For example, the sensors 46, 48 may be used to generate signals relating to the parameter and/or condition being monitored, which can then be utilized by the turbine controller 26 or other suitable device to determine the actual parameter and/or condition. For instance, in one embodiment, the sensors 46, 48 can be encoders that provide pitch angle position back to a pitch controller and ultimately back to the turbine controller 26. The pitch angle position can be used as feedback for the pitch drive mechanism 30 to adjust the pitch angle of the rotor blades 22 in accordance with the pitch angle setpoint.

Figure 3:
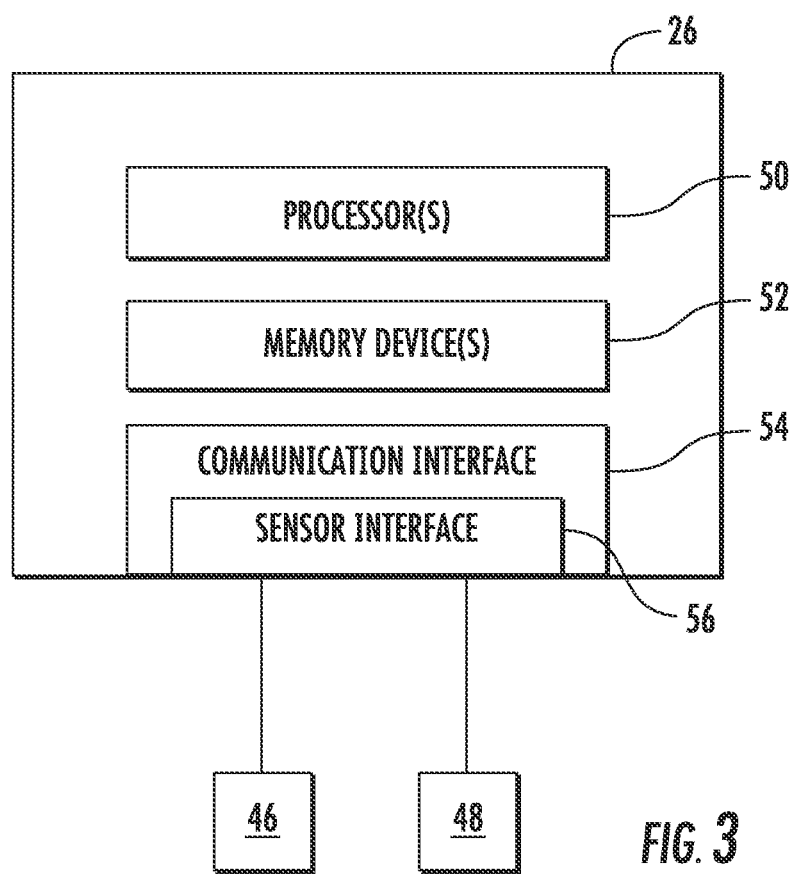
FIG. 3 illustrates a block diagram of one embodiment of a wind turbine controller according to the present disclosure.

Referring now to FIG. 3, there is illustrated a block diagram of one embodiment of suitable components that may be included within the turbine controller 26 in accordance with example aspects of the present disclosure. As shown, the turbine controller 26 may include one or more processor(s) 50 and associated memory device(s) 52 configured to perform a variety of computer-implemented functions (e.g., performing the methods, steps, calculations and the like disclosed herein). Thus, in several embodiments, the turbine controller 26 may include suitable computer-readable instructions that, when executed by the one or more processor(s) 50, configure the controller 26 to perform various different functions, such as receiving, transmitting and/or executing wind turbine control signals. As such, the turbine controller 26 may generally be configured to control the various operating modes (e.g., start-up or shut-down sequences) and/or components of the wind turbine 10.

Additionally, the turbine controller 26 may also include a communications interface 54 to facilitate communications between the controller 26 and the various components of the wind turbine 10. An interface can include one or more circuits, terminals, pins, contacts, conductors, or other components for sending and receiving control signals. For instance, the communications interface 54 may serve as a first interface to permit the turbine controller 26 to receive control signals indicative of a pitch angle setpoint from the pitch drive mechanism 30 and to transmit control signals to each pitch drive mechanism 30 for controlling the pitch angle of the rotor blades 22. Moreover, the controller 26 may include a sensor interface 56 (e.g., one or more analog-to-digital converters) to permit signals transmitted from the sensors 46, 48 to be converted into signals that can be understood and processed by the processor(s) 50.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 52 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 52 may generally be configured to store suitable computer-readable instructions that, when implemented by the processor(s) 50, configure the controller 26 to perform various functions including, but not limited to, receiving control signals indicative of pitch angle setpoints, receiving signals from the anemometer 46, determining adjusted pitch angle setpoints, and/or transmitting suitable control signals indicative of adjusted pitch angle setpoints to one or more of the pitch drive mechanisms 30, and various other suitable computer-implemented functions.

Figure 4:
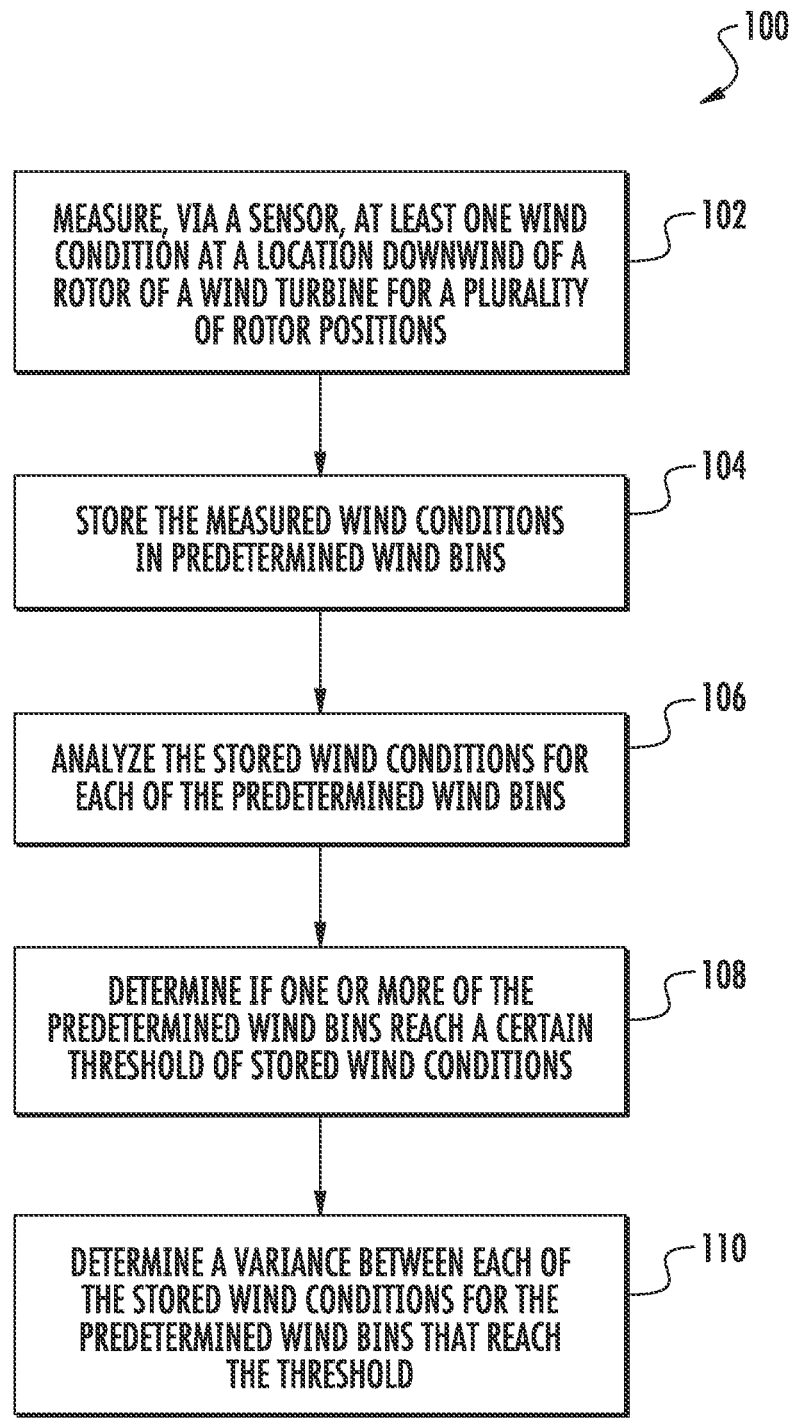
FIG. 4 illustrates a flow diagram of one embodiment of a method for detecting rotor asymmetry of a wind turbine according to the present disclosure.
Figure 5:
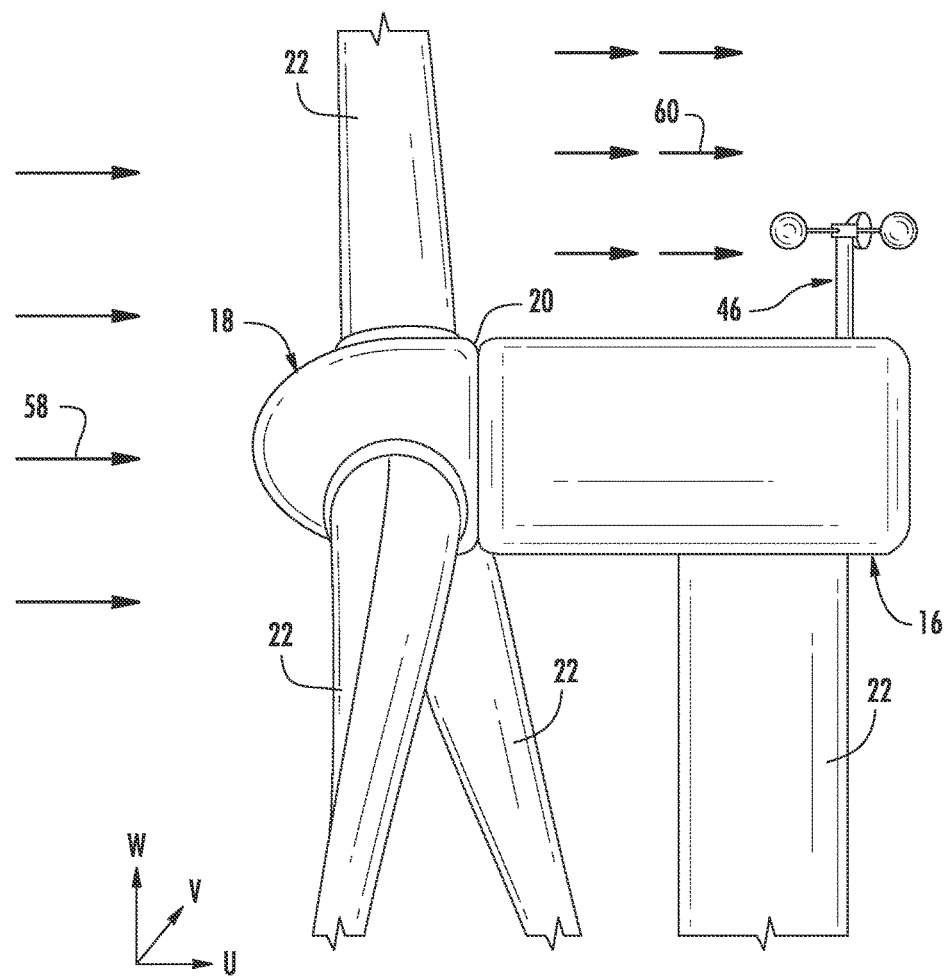
FIG. 5 illustrates a detailed, side view of one embodiment of a wind turbine, particularly illustrating the wind turbine yawed into the wind according to the present disclosure.

Referring now to FIG. 4, a flow diagram of one embodiment of a method 100 for detecting rotor asymmetry of a wind turbine 10 that may be implemented by the controller 26 is illustrated. As shown at 102, the method 100 includes measuring, via a sensor, at least one wind condition at a location downwind of the rotor for a plurality of rotor positions. As mentioned, the sensor 46 is typically an anemometer mounted to the top of the nacelle 16 (FIG. 5) that is configured to measure one or more wind conditions. More specifically, as shown in FIG. 5, the wind turbine 10 is positioned, e.g. via the yaw bearing 68, into the wind (arrows 58) such that wind first passes over the rotor 18 and then to the nacelle 16. As mentioned, the transfer function between the measured wind speed (arrows 60) via the anemometer 46 and the free flow wind speed (arrows 58) depends on a plurality of factors as the wind first passes over the rotor 18 and then to the anemometer 46, which inherently changes the properties of the wind measured by the anemometer 46. Such factors include but are not limited to the mounting location of the anemometer 46, the spinner surface, blade design, and/or pitch behavior. As such, in certain embodiments, the transfer function can be used to determine whether rotor asymmetry is present in the wind turbine 10.

In addition, for each measured wind condition, the rotor position is measured and stored in predetermined position bins. More specifically, as shown in the embodiment of FIG. 2, the rotor position may be measured (e.g. via a rotor position sensor or encoder) at the slip ring or at any other location near the generator shaft 34 of the wind turbine 10.

Figure 6:
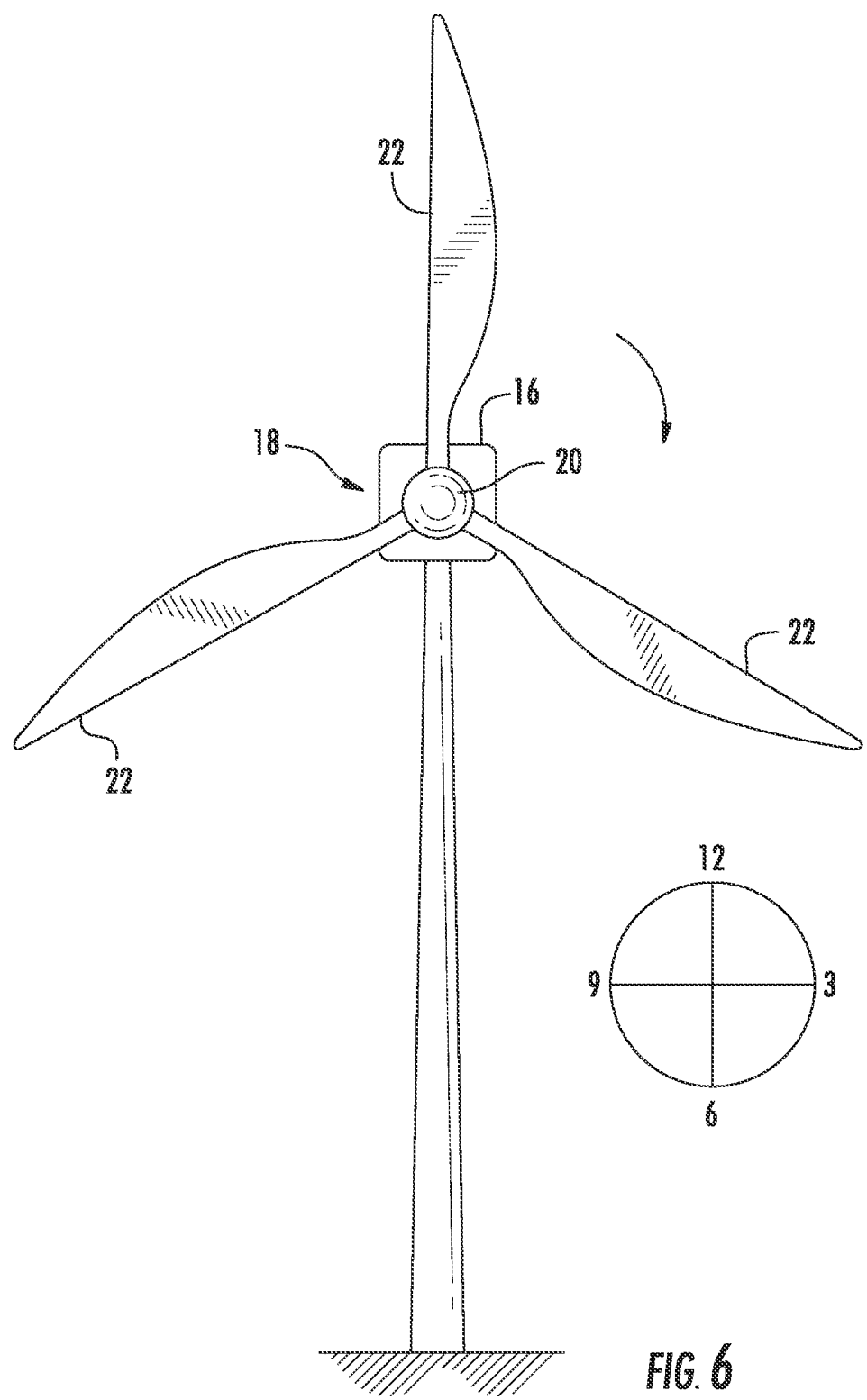
FIG. 6 illustrates a front view of one embodiment of a wind turbine according to the present disclosure.

More particularly, as shown in FIGS. 5 and 6, the relevant rotor positions are defined by the rotor blades 22 rotating through the wind stream of the sensor 46, i.e. through a twelve o'clock position of the rotor 18. As such, the wind condition can be measured each time one of the blades 22 passes through the twelve o'clock position (with the other two blades in a rabbit-eared configuration). Thus, as shown, when one of the rotor blades 22 is located in the twelve o'clock position, such blade 22 interferes with the wind stream of the sensor 46 (indicated by arrows 58 and 60). In other words, the actual wind stream 58 may have different wind properties than the detected or measured wind stream 60. As such, the present invention uses the relationship of the blade pitch angle and the measured wind condition to determine the difference in pitch angle setpoints from one blade to another to indicate rotor asymmetry.

Figure 7:
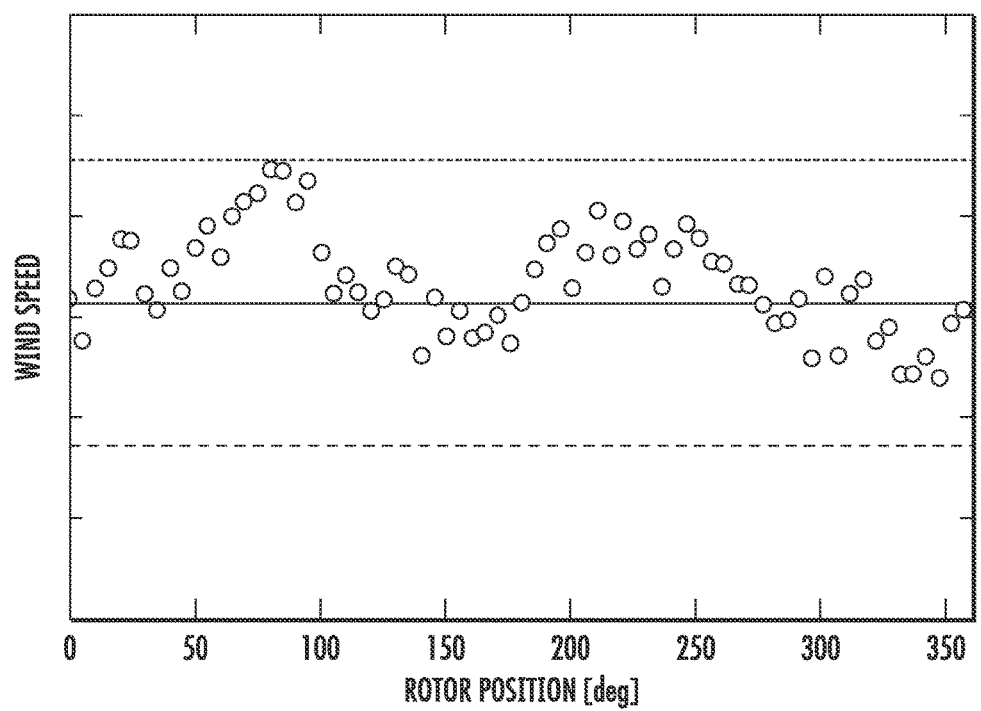
FIG. 7 illustrates a graph of one embodiment of wind speed (y-axis) plotted as a function of rotor position (x-axis) according to the present disclosure, particularly illustrating a wind turbine that is unaffected by rotor asymmetry (i.e. normal or standard operation)
Figure 8:
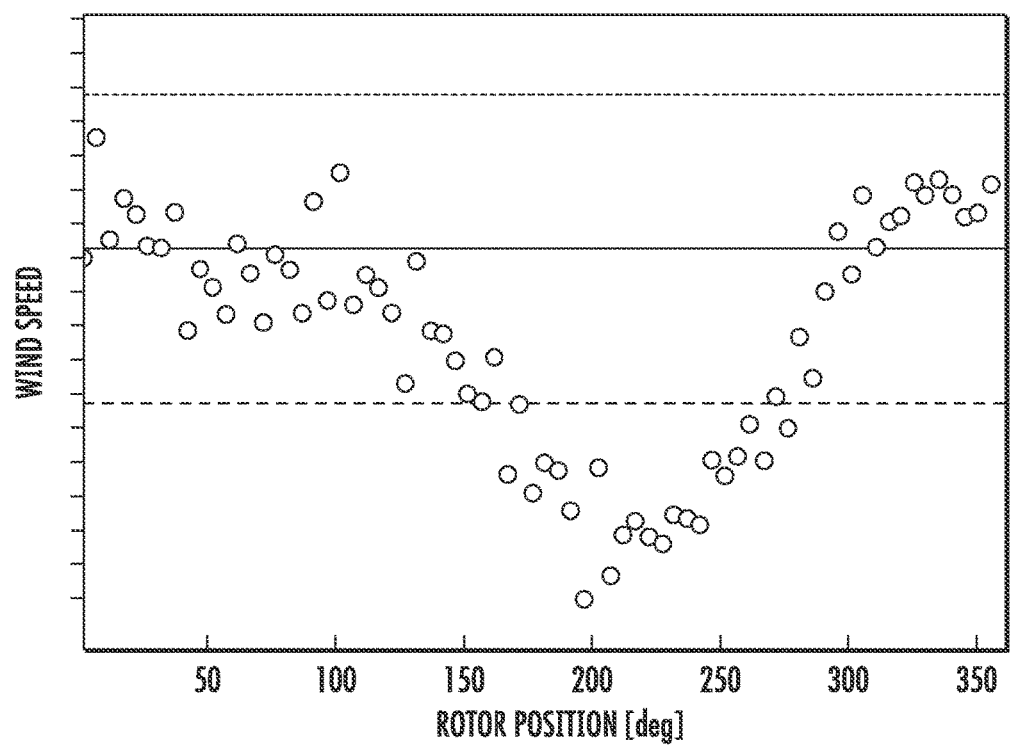
FIG. 8 illustrates a graph of one embodiment of wind speed (y-axis) plotted as a function of rotor position (x-axis) according to the present disclosure, particularly illustrating a wind turbine that is affected by rotor asymmetry.

Referring now to FIGS. 7 and 8, various graphs of wind speed (y-axis) plotted as a function of rotor position (x-axis) according to the present disclosure are illustrated. More specifically, FIG. 7 illustrates a graph of one embodiment of a baseline wind turbine unaffected by rotor asymmetry, whereas FIG. 8 illustrates a graph of one embodiment of a wind turbine that is affected by rotor asymmetry. Thus, as shown, FIGS. 7 and 8 illustrate the blade passage effect (i.e. when one of the rotor blades 22 passes through the wind stream of the sensor 46). More specifically, the plots of the measured wind speed along the rotor axis "U" (FIG. 6) as a function of the rotor position are illustrated. As shown, the plots illustrate the measured wind speed measured with a three-dimensional, sonic recording anemometer along the axis of the rotor as a function of the angular position of the rotor for measurements falling into a "bin" value of between, e.g. nine and ten meters per second (m/s) along the rotor axis "U" in FIG. 6. However, other anemometers and/or spatial orientations may also be used.

At 104, after the wind condition(s) is measured for a plurality of rotor positions over a predetermined time period, the method 100 includes storing the measured wind condition(s) in predetermined bins. At 106, the controller 26 analyzes the data, for example, by averaging the data over a certain time period. At 108, the controller 26 determines if one or more of the predetermined bins reach a certain threshold of captured wind conditions. At 110, if a particular bin has a certain amount of captured data points, then the controller 26 is configured to determine a variance between each of the measured wind conditions at each of the rotor positions for the predetermined bins that have reached the threshold. For example, in one embodiment, the controller 26 may be configured to start the analysis when a certain amount of data points have been captured for a certain bin, e.g. one hour. In other words, each of the measured wind conditions for each of the rotor positions are compared to each other to determine if one or more of the measured wind conditions varies with respect to the other measured values. If a variance between any one of the measured wind conditions is greater than a predetermined amount, then the pitch angle of that rotor blade is likely offset as compared to the remaining rotor blades. Thus, the varying pitch settings are indicative of rotor asymmetry.

More specifically, in certain embodiments, the controller 26 may be preprogrammed with predetermined pitch angle settings or setpoints for each of the rotor blades 22. As such, the controller 26 may be configured to determine a difference between the predetermined pitch angle settings from one rotor blade 22 to another based on the variance (if any) between the measured wind conditions. In other words, in certain instances, a varying pitch angle of a predetermined amount when compared to the pitch angle of the other rotor blades can be representative of rotor asymmetry.

In certain embodiments, the predetermined amount may include the remaining measured wind conditions (or pitch angle) plus or minus from about 3%. In still further embodiments, the predetermined amount may be any other suitable amount including the remaining measured wind conditions (or pitch angle) plus or minus more than 3% or less than 3%.

In alternative embodiments, rather than comparing the measured wind conditions detected at each rotor position to detect rotor asymmetry, the controller 26 is also configured to compare the measured wind conditions for each of the rotor positions with a predetermined range. As such, the controller 26 is configured to detect rotor asymmetry if any one of the measured wind conditions are outside of the predetermined range for a predetermined time period.

If the turbine controller 26 detects rotor asymmetry, the controller 26 may implement a corrective action so as to reduce loads that may be caused by the rotor asymmetry. For example, in certain embodiments, the corrective action may include at least one of or a combination of the following: altering a pitch angle of a rotor blade, modifying a generator torque, modifying a generator speed, modifying a power output, yawing a nacelle of the wind turbine, braking one or more wind turbine components, activating an airflow modifying element on a rotor blade, or similar.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a wind turbine in response to detecting rotor asymmetry, the method comprising:
   measuring, via a wind sensor, at least one wind condition at a location downwind of the rotor for a plurality of rotor positions;
   storing the measured wind conditions in predetermined wind bins stored in a turbine controller;
   analyzing, via the turbine controller, the stored wind conditions in each of the predetermined wind bins;
   determining via the turbine controller, if one or more of the predetermined wind bins reach a certain threshold of stored wind conditions; and,
   determining, via the turbine controller, a variance between each of the stored wind conditions for the predetermined wind bins that reach the certain threshold of stored wind conditions, wherein a variance between any one of the measured wind conditions greater than a predetermined amount is indicative of rotor asymmetry; and,
   implementing, via the turbine controller, a corrective action when the variance between any one of the measured wind conditions is greater than the predetermined amount, wherein the corrective action comprises at least one of altering a pitch angle of a rotor blade, modifying a generator torque, modifying a generator speed, modifying a power output, yawing a nacelle of the wind turbine, braking one or more wind turbine components, activating an airflow modifying element on a rotor blade, or sending an alarm.

2. The method of claim 1, wherein analyzing the stored wind conditions for a certain time period further comprises averaging the stored wind conditions over the certain time period.

3. The method of claim 1, further comprising storing the rotor positions for each of the measured wind conditions, and plotting the stored wind conditions for the predetermined wind bins that reach the threshold against the stored rotor positions.

4. The method of claim 1, wherein the predetermined amount comprises the remaining stored wind conditions plus or minus from about 3%.

5. The method of claim 1, further comprising providing predetermined pitch angle settings for each of the rotor blades of the wind turbine at an installation of the wind turbine.

6. The method of claim 5, further comprising determining a difference between the predetermined pitch angle settings of each of the rotor blades at installation and current pitch angle settings.

7. The method of claim 1, wherein the plurality of rotor positions are defined by the rotor blades rotating through a twelve o'clock position.

8. The method of claim 7, wherein the twelve o'clock position intersects with a wind stream of the sensor.

9. The method of claim 1, wherein a variance of any one of the stored wind conditions from the remaining stored wind conditions greater than the predetermined amount is indicative of a varying pitch angle for a corresponding rotor blade when compared to the remaining rotor blades, wherein the varying pitch angle is representative of rotor asymmetry.

10. The method of claim 1, wherein the sensor comprises an anemometer mounted to the nacelle.

11. A method for operating a wind turbine, the method comprising:
  measuring, via a wind sensor, at least one wind condition at a location downwind of the rotor for a plurality of rotor positions;
  storing the wind conditions in predetermined wind bins stored in a turbine controller;
  determining, via the turbine controller, if one or more of the predetermined wind bins reach a certain threshold of stored wind conditions;
  comparing, via the turbine controller, the measured wind conditions for each of the rotor positions for the predetermined wind bins that reach the certain threshold with a predetermined range, wherein a measured wind condition outside of the predetermined range is indicative of rotor asymmetry; and,
  implementing, via the turbine controller, a corrective action when at least one of the measured wind conditions is outside of the predetermined range, wherein the corrective action comprises at least one of altering a pitch angle of a rotor blade, modifying a generator torque, modifying a generator speed, modifying a power output, yawing a nacelle of the wind turbine, braking one or more wind turbine components, activating an airflow modifying element on a rotor blade, or sending an alarm.

12. The method of claim 11, further comprising storing the rotor positions for each of the measured wind conditions, and plotting the stored wind conditions for the predetermined wind bins that reach the threshold against the stored rotor positions.

13. The method of claim 11, further comprising providing predetermined pitch angle settings for each of the rotor blades of the wind turbine at installation of the wind turbine.

14. The method of claim 13, wherein comparing the measured wind conditions for each of the rotor positions for the predetermined wind bins that reach the threshold with a predetermined range further comprises:
  determining current pitch angle settings based on the measured wind conditions, and
  determining a difference between the predetermined pitch angle settings and the current pitch angle settings.

15. The method of claim 14, wherein a difference of any one of the current pitch angle settings from the remaining current pitch angle settings greater than a predetermined amount is indicative of a varying pitch angle for a corresponding rotor blade when compared to the remaining rotor blades, wherein the varying pitch angle is representative of rotor asymmetry.

16. The method of claim 11, wherein the plurality of rotor positions are defined by the rotor blades rotating through a twelve o'clock position.

17. The method of claim 16, wherein the twelve o'clock position intersects with a wind stream of the sensor.

18. The method of claim 11, wherein the sensor comprises an anemometer mounted to the nacelle.

* * * * *